(12) United States Patent
Salminen et al.

(10) Patent No.: US 7,761,815 B2
(45) Date of Patent: Jul. 20, 2010

(54) METHOD FOR CHATTING, AND TERMINAL UTILIZING THE METHOD

(75) Inventors: Aki Salminen, Oulu (FI); Ari Salmi, Oulu (FI); Arto Nabbvik, Kello (FI); Pekka Väyrynen, Oulu (FI)

(73) Assignee: Nokia Corporation, Espoo (FI)

( * ) Notice: Subject to any disclaimer, the term of this patent is extended or adjusted under 35 U.S.C. 154(b) by 942 days.

(21) Appl. No.: 10/454,642

(22) Filed: Jun. 3, 2003

(65) Prior Publication Data

US 2003/0234814 A1 Dec. 25, 2003

(30) Foreign Application Priority Data

Jun. 24, 2002 (FI) .................................. 20021224

(51) Int. Cl.
*G06F 3/00* (2006.01)
*G06F 3/14* (2006.01)
*G06F 3/048* (2006.01)

(52) U.S. Cl. .................... 715/864; 715/758; 715/759

(58) Field of Classification Search ................. 715/758, 715/759, 773, 864
See application file for complete search history.

(56) References Cited

U.S. PATENT DOCUMENTS

| 6,519,771 B1* | 2/2003 | Zenith ................. 715/758 |
| 7,190,351 B1* | 3/2007 | Goren ................. 715/864 |
| 2002/0026483 A1* | 2/2002 | Isaacs et al. ............. 345/864 |
| 2002/0034281 A1* | 3/2002 | Isaacs et al. ............. 709/206 |
| 2004/0130575 A1* | 7/2004 | Tai et al. ................ 345/773 |

FOREIGN PATENT DOCUMENTS

| EP | 0946028 A2 | 9/1999 |
| EP | 1031912 A1 | 8/2000 |
| EP | 1109415 A2 | 6/2001 |

OTHER PUBLICATIONS

David Pogue, PalmPilot The Ultimate Guide, Year of Publication 1999, pp. 18, 43-45, 47, and 542-543.*
David Pogue, PalmPilot The Ultimate Guide, Year of Publication 1999, pp. 8, 14 and 512.*
IRP2PChat v2.0 "Chat" between two Palms . . . http://www.iscomplete.com, Downloaded from the Internet Jun. 29, 2007.
Internet Archive: Details: IRP2PChat, http://www.archive.org, May 1999.

* cited by examiner

*Primary Examiner*—Weilun Lo
*Assistant Examiner*—Truc T Chuong
(74) *Attorney, Agent, or Firm*—Harrington & Smith

(57) ABSTRACT

The invention relates to a method for utilizing a cellular terminal to simultaneously receive messages and process messages to be sent without the user having to change between display modes of the terminal. For instance, in response to a press of an alphanumeric key, a pop-up display is opened in a display area of the cellular terminal. The pop-up display covers a part of the terminal's display area and is used for composing/editing a user message suitable for forming part of a chat. The invention also relates to a cellular terminal utilizing the method and computer program products according to the invention.

23 Claims, 4 Drawing Sheets

METHOD FOR CHATTING, AND TERMINAL UTILIZING THE METHOD

The invention relates to a method for making user information processing easier at a cellular terminal while connected to a chat in which messages are processed on the display of the terminal. The invention also relates to a cellular terminal utilizing the method and software means realizing the method.

Various diversional services, in which a plurality of users may participate simultaneously, have become popular in telecommunication networks. Such chats, as they are called, were first organized within the framework of normal telephone network whence the idea later crossed over to data network side, especially the Internet. In these services a group connected to a certain service can exchange verbal or written messages so that all members of the group receive the messages.

Figure 1A:
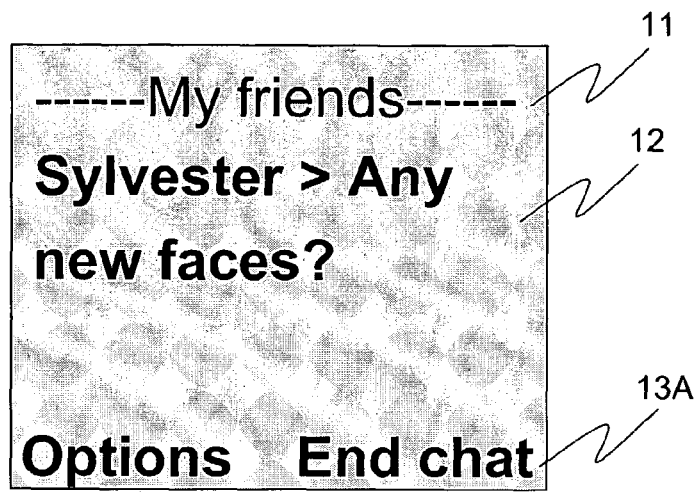

This kind of online "chatting" between two or more parties may also take place in various cellular telephone networks. Young people in particular are keen on communicating within a group through SMS messages or the like. FIG. 1a shows an example of the display of a terminal during a chat session. Topmost, reference number 11, there is displayed the name of the chat group. Below that there is shown the latest received message in field 12. At the bottom of the display there are so-called soft keys in field 13A. A soft key can be selected by pressing a real key at the terminal which realizes the function of the soft key. Usually this key is the real key situated nearest to the soft key in question. In the example of FIG. 1a the user has two options in field 13A to select from: either to end the chat by selecting the "End chat" key or to go to a new screen and/or menu row by selecting the "Options" key whereby some function other than browsing/reading a received message may be selected. The user may e.g. select a function to write a message. When the message is ready, it is sent by selecting the soft key intended for that purpose.

Mobile cellular terminals are usually small in size. Therefore, the size of a terminal's display is limited, too. A participant in a chat thus has to read the messages in one display mode and compose his messages in another mode. The user of the terminal has to continually jump back and forth between these two display modes while active in a chat. This slows down the exchange of messages and, moreover, involves the risk that the user accidentally deletes/removes information which has been received or is awaiting to be sent. Furthermore, a participant in a chat has no knowledge about other participants in the chat.

An object of the invention is to provide a new kind of display mode with associated menus for chats on cellular terminals, where a user is able to receive and send messages without changing from a basic display mode to some other mode. Another object of the invention is to make it possible for the user of a terminal to receive a list of other participants in a chat.

The objects of the invention are achieved by a process where, when the user of a terminal is participating in a chat, the pressing of any key intended for entering letters or numbers will open a pop-up display according to the invention in part of the terminal's display screen for typing and editing a message to be sent. In addition to the pop-up display there is room on the terminal's display screen for the simultaneous browsing and reading of messages received. The pop-up display may also be used in connection with other processing functions required during the chat. For instance, the names of the participants may be listed there.

An advantage of the invention is that the user needn't change from a display mode to another during a chat, but he will be able to use one and the same display mode for both reception and sending of messages.

Another advantage of the invention is that while composing a message, a user can scroll the messages received on the terminal's display. Furthermore, new messages received will automatically appear on the terminal's display even if a message to be sent were being processed in the pop-up display. This makes the exchange of messages easier and quicker especially if the user wants to answer questions sent separately by multiple participants.

A further advantage of the invention is that the terminal's whole display screen will be available to the messages received when the user is not composing a message.

Yet another advantage of the invention is that a user can quickly get information about the other participants in the chat.

A chat method according to the invention is characterized in that a press of an alphanumeric key at a terminal opens in the display area of the terminal a pop-up display covering part of the display area for carrying out user information processing.

A cellular terminal according to the invention connected to a chat is characterized in that the terminal further comprises at the disposal of the terminal connected to a chat a means by which a pop-up display is arranged to be opened in the display area of the user interface for carrying out user information processing when an alphanumeric key at the terminal has been pressed.

Software means according to the invention used at a cellular terminal is characterized in that it comprises a step of selecting an operating mode with the following options: ending the chat, moving into a menu function or pressing a key at the terminal to open a pop-up display in part of the display area of the terminal for the purpose of information processing at the terminal.

Advantageous embodiments of the invention are specified in the dependent claims.

The idea of the invention is basically as follows: A terminal includes a software application to control the terminal's display in the manner described below. While the user is just receiving and reading messages from other chat participants the display of the terminal functions according to the prior art. This means that a recipient is able to read and scroll messages in a field for received messages at his terminal. If the user wants to send a message, he simply starts typing the message on the keyboard or keypad of the terminal. The first key press opens in the terminal's display screen a pop-up display covering part of the display screen, showing the message composed. The display area of the terminal is not, however, completely reserved for the message to be sent, but a portion of the display area always remains for displaying messages received and for selecting soft keys. Thus, while the user is composing his message he can simultaneously browse the messages received. When the message to be sent is ready, the user advantageously selects the "Options" key in the menu field displayed at the terminal. This opens a menu where the user is able to select a "Send" command whereby the message is sent to the terminals of the other chat participants. At the same time, the pop-up display 14 according to the invention is closed and the display 21 of the terminal 20 goes into a state according to the prior art. In accordance with an advantageous embodiment of the invention, the pop-up display may also be used to list the names of the other currently active chat participants.

Figure 2:
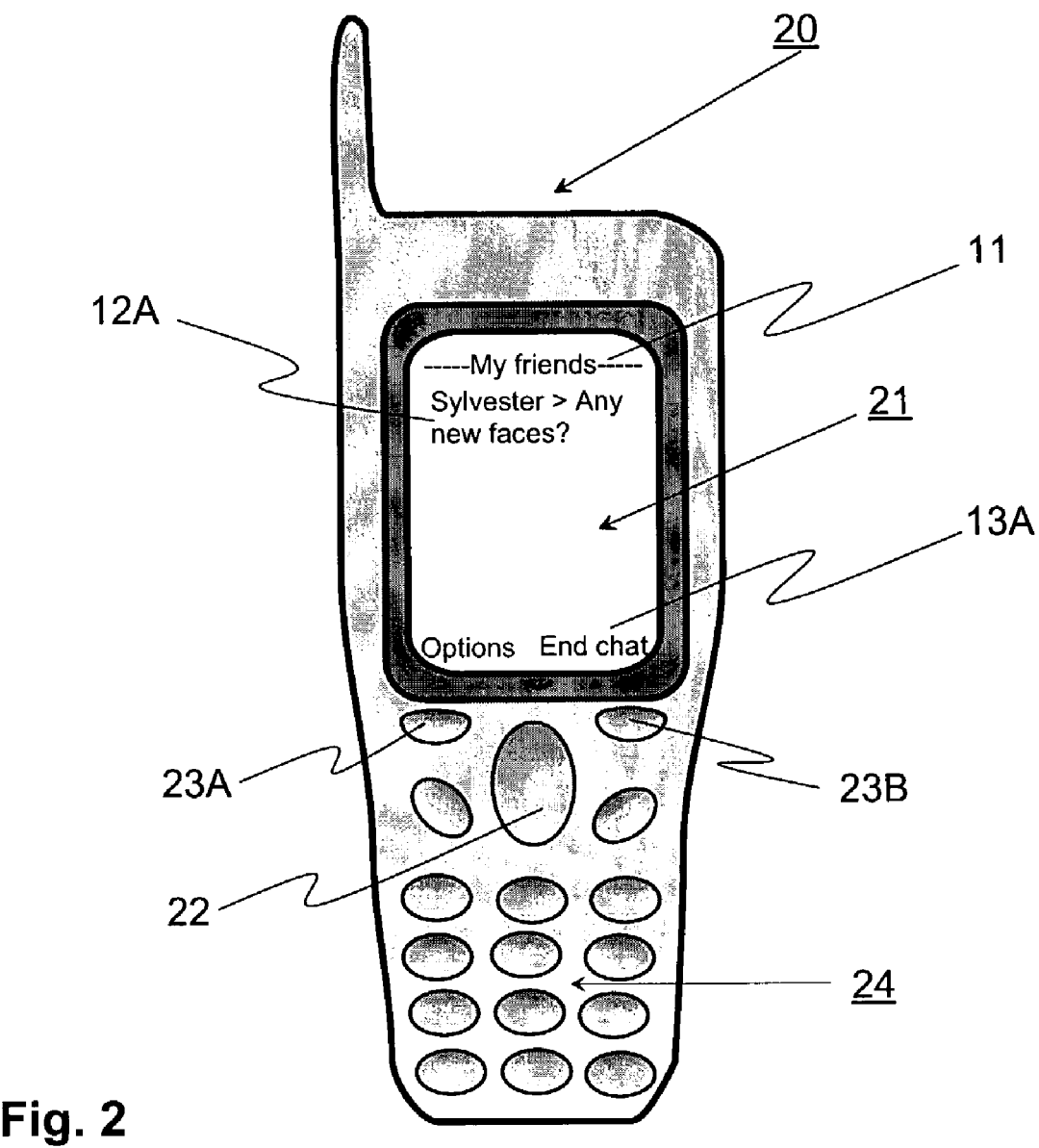
Figure 3:
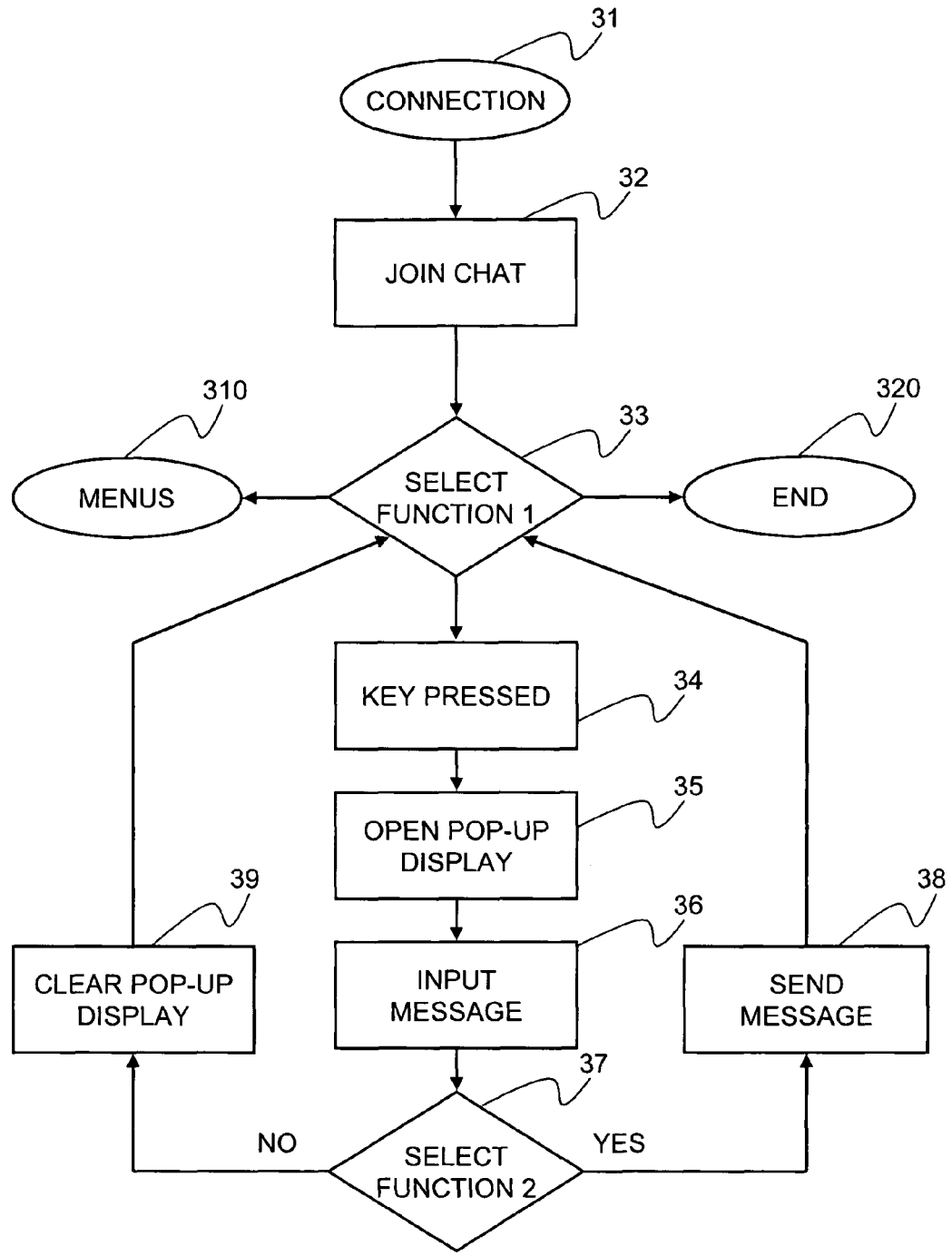
Figure 4:
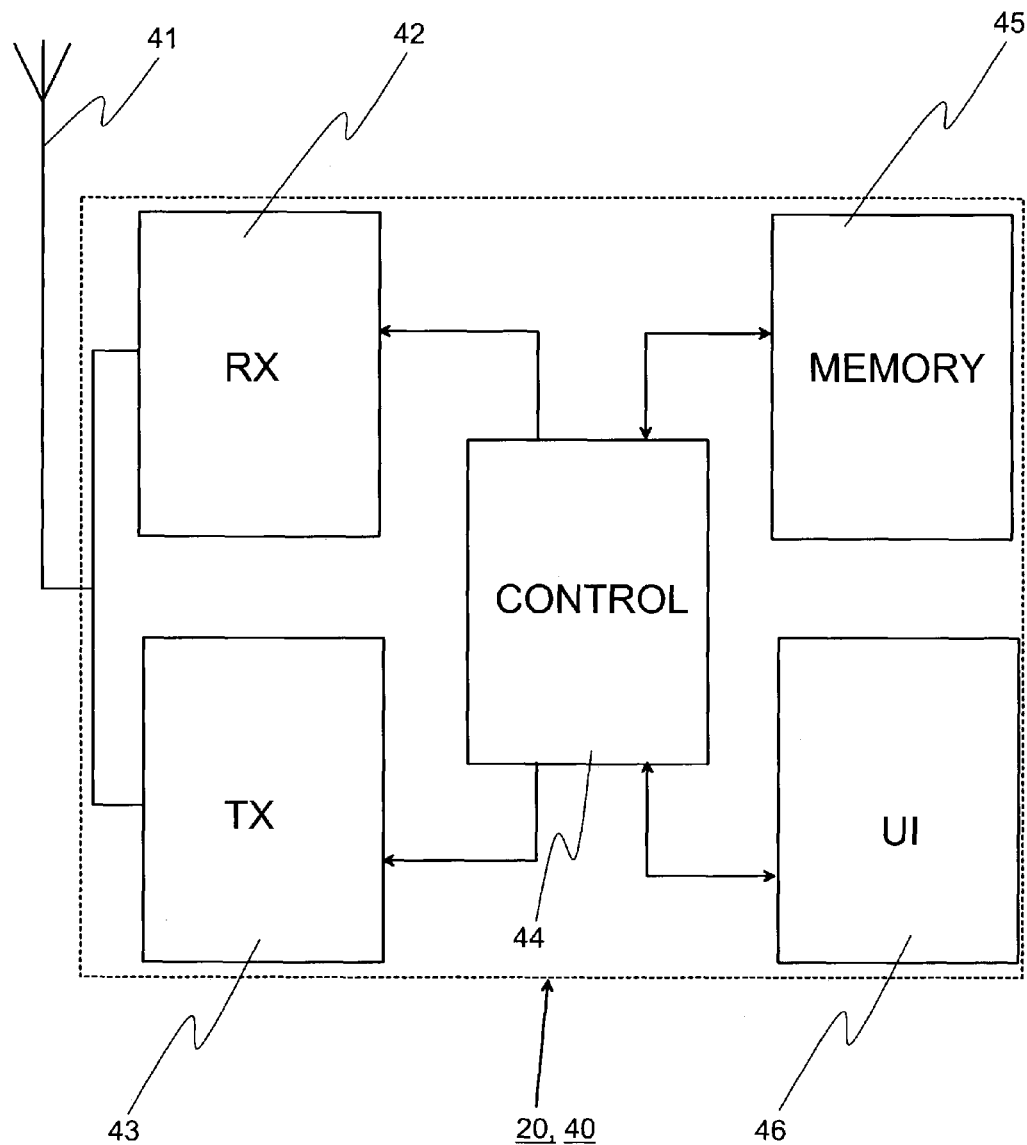

The invention is described in detail below. Reference is made to the accompanying drawings in which FIG. 1a shows an example of a state of a terminal's display according to the prior art, FIG. 1b shows an example of a state of a terminal's display according to the invention employing a pop-up display, FIG. 1c shows an example of a state of a terminal's display after the completion of the procedure according to the invention, FIG. 2 shows an example of a terminal which can utilize the method according to the invention, FIG. 3 shows an example of a flow diagram depicting the steps of utilizing a pop-up display according to the invention, and FIG. 4 shows an example of the main components of a terminal utilizing the method according to the invention.

FIG. 1a was discussed in conjunction with the description of the prior art.

Figure 1B:
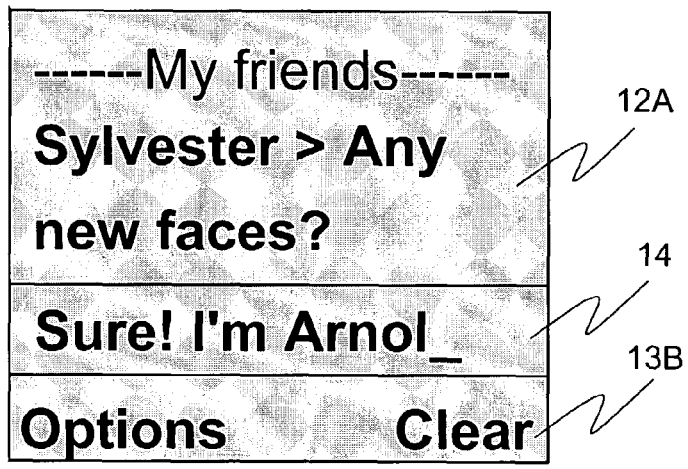
Figure 1C:
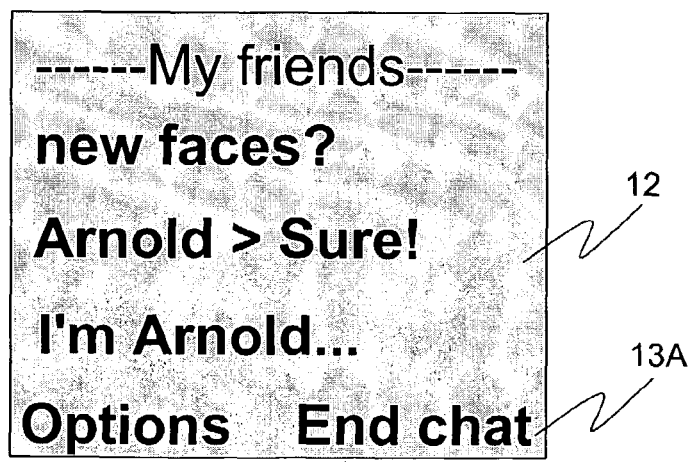

FIG. 1b illustrates in an example the operation of the pop-up display according to the invention used at a cellular terminal. The state shown in FIG. 1b is the result of the user pressing an alphanumeric key 24 at the terminal 20 depicted in FIG. 2. Following the key press, a pop-up display 14 appears on the display area 21 of the terminal. Advantageously the pop-up display 14 is opened above the field 13B which displays soft keys. In the example of FIG. 1b the user has entered a text "Sure! I'm Arnold" in the pop-up display. The pop-up display according to the invention may advantageously be separated from the rest of the text on the display 21 of the terminal 20 e.g. by changing the text color, the text font, or the background color for the text, or, as in FIG. 1b, by drawing borders for the pop-up display 14 that separate it from the rest of the display area 21 of the terminal 20. Furthermore, the pop-up display 14 according to the invention may contain a symbol which indicates that the display in question is intended for composing/editing messages.

Having finished composing the message, the user can send it by selecting in field 13B the "Options" key which opens a menu where the command "Send" will send the message to the other participants. It is also possible to use the "normal green" send button for sending the composed message.

Optionally, the user can delete text by pressing the soft key "Clear". If the user clears all the characters that were entered in the pop-up display 14, the display of the terminal returns to the prior-art state according to the FIG. 1a. The pop-up display 14 according to the invention then disappears. Likewise, sending the message will clear the pop-up display 14 according to the invention, returning the prior-art state according to FIG. 1a. Thus the whole field 12 reserved for messages received on the display 21 is again available for the purpose of browsing messages received/sent, as shown in FIG. 1c. If the user sent the message, it remains in the list of messages sent and received, as shown in FIG. 1c, field 12.

In the example of FIG. 1b, the user, while composing a message in the pop-up display according to the invention, is able simultaneously to browse the messages received in field 12A of the display area 21. Received messages can be advantageously scrolled using a four-way key 22. Thus a desired message or portion of a message can be brought into the display 21 of the terminal 20.

The pop-up display 14 shown in FIG. 1b can also be used for listing the names of the participants in the current chat. This function can be activated advantageously through an option in the "Options" menu. In this embodiment the user is able to browse the list of participants during a chat while simultaneously browsing messages received.

FIG. 2 shows by way of example a cellular terminal 20 employing the invention. Here the display 21 of the terminal 20 is in a state according to the prior art. In this state, the display area comprises a field 11 which displays the name of the current chat. The soft keys are shown in field 13A and the associated physical keys are represented by reference designators 23A and 23B. The four-way key, which can be used for scrolling the messages in the display, is represented by reference designator 22. The normal alphanumeric keys which produce the pop-up display are represented by reference designator 24.

FIG. 3 shows, as an example, a flow diagram depicting how a pop-up display 14 according to the invention can be utilized at a cellular terminal 20. At the initial state 31 the user of the terminal is connected to a cellular network capable of message exchange. The cellular network may be either a circuit-switched or packet-switched network. In step 32 the user joins an ongoing chat. When the user has joined the chat, the display of the user's terminal is in a state according to FIG. 1a which describes the prior art. Advantageously the user then has got three options. He can select the "End chat" key in which case he will exit the chat, step 320. By pressing the "Options" key he will be displayed other soft keys by means of which he can carry out desired chat functions, step 310.

The third option for the user of the terminal is to press an alphanumeric key 24 at the terminal 20, step 34. Pressing a key 24 will open a pop-up display 14 according to the invention, step 35, depicted in FIG. 1b. The user can compose a message in step 36. At the same time he can use the free portion of the terminal's 20 display area 21 to browse messages received. Advantageously he can scroll the messages using the four-way key 22.

Having completed the message the user has got two options at step 37. He can send the message at step 38 or clear the terminal's 20 pop-up display 14 at step 39. The user selects the desired option using keys "Options" or "Clear". Pressing the "Options" key opens a menu where advantageously a "Send" command can be selected to send the message to the other participants. Sending the message will clear the pop-up display 14, and the pop-up display will disappear from the terminal's 20 display 21. The process then returns to step 33. The same happens if all the characters entered in the pop-up display 14 are removed using the "Clear" key. In this situation the user may either exit the chat, step 320, choose a new option in a menu, step 310, or again produce the pop-up display according to the invention by pressing a key 24 at the terminal 20.

Naturally the pop-up display 14 according to the invention can be used to show/edit any information that the user of the terminal may need during an ongoing chat. For example at menu step 310 there advantageously is an option to send an inquiry about the current chat participants to the serving network. The result of the inquiry is advantageously shown at the terminal using the pop-up display 14 according to the invention.

An essential thing in the utilization of the pop-up display 14 according to the invention is that it is used only when the user of the terminal 20 needs a piece of information or is editing information shown on the display 21 of the terminal 20. When there is no such need, the whole display 21 of the terminal, which has rather a limited size, can be used for browsing or reading messages received. This makes the processing of received messages quicker. By means of the pop-up display according to the invention the user of the terminal can have a question/comment, presented during a chat, visible all the time that the user is editing or composing an answer message. The user doesn't have to rely on his memory or jump between read and write modes through a menu structure. This way, utilization of the pop-up display 14 according to the invention makes message exchange easier and quicker compared to the prior art.

The block diagram in FIG. 4 shows, as an example, the main functional elements of a terminal 20 depicted in FIG. 2. The pop-up display 14 according to the invention is advantageously applied in a cellular terminal 20/40 according to FIG. 4. For the most part the terminal may be in accordance with the prior art. The cellular terminal 20/40 uses an antenna 41 for both sending and reception. Reference designator 42 represents the means that constitute the receiver (RX) in the terminal 20/40 through which the wireless terminal 20/40 receives messages from the cellular network. The receiver (RX) comprises prior-art means for all signal-processing related functions performed on the signals received.

Reference designator 43 represents the means that constitute the transmitter (TX) in the wireless terminal 20/40. The transmitter means 43 perform all the necessary signal processing operations on the signal transmitted to a cellular network.

Operation of the wireless terminal 20/40 is controlled by a control unit 44 (CONTROL). It controls the operation of all the main components in the terminal 20/40. It controls both reception and transmission. Moreover, it is used to control both the user interface 46 (UI) and memory 45 of the terminal 20/40. The user interface 46 comprises a display 21, physical keys 24, and the soft keys required by the application.

A software application according to the invention which comprises a pop-up display may operate as such in a prior-art control unit 44 of a terminal 20/40. When an alphanumeric key is pressed on a keyboard 24 of a user interface 46 of a terminal 20/40 connected to a chat, the display 21 of the terminal 20/40 is changed so that it is in accordance with the application according to the invention started at the terminal. Then the pop-up display 14 will be available for writing/editing functions carried out by the user.

Advantageous embodiments according to the invention were described above. The invention is not limited to the embodiments described. For example, functions other than the example functions described in the above examples can also be carried out in the pop-up display. The inventional idea can be applied in numerous ways within the scope defined by the claims attached hereto.

The invention claimed is:

1. A method comprising:
   connecting a portable wireless apparatus to a chat in which messages are processed on a display area of the apparatus, and during the chat, monitoring a plurality of alphanumeric keys for a press to begin composition of a chat message
   and in response to a press of any one of the plurality of monitored alphanumeric keys at the apparatus, opening in the display area of the apparatus a pop-up display covering part of the display area of the apparatus, and
   allowing the pop-up display to be used for displaying a composed and edited user message suitable for forming part of the chat, in which the user message is composed and edited using at least input from at least one of the plurality of alphanumeric keys,
   in which a part of the display area uncovered by the pop-up display comprises a field for reading messages of the chat, and
   wherein information in the pop-up display and information in the field for reading messages are processed separately such that processing the information in the pop-up display does not affect contents of the field for reading messages, and such that while the pop-up display is open the contents of the field for reading messages can be read without any effect on the contents of the pop-up display.

2. A method according to claim 1 wherein the pop-up display is separated from other fields of the display area of the terminal in one of the following ways: separating the pop-up display by horizontal lines from other fields of the display area, bringing a symbol on the display area that indicates writing/editing of text, changing the color of text entered in the pop-up display, changing the color of the background in the pop-up display, or changing the text font in the pop-up display.

3. A method according to claim 1, further comprising, in response to a user selection, transmitting the user message as part of the chat.

4. A method according to claim 3, further comprising removing the pop-up display from the display area of the apparatus after the user message has been transmitted.

5. A method according to claim 1, further comprising, in response to a user selection, deleting the user message.

6. A method according to claim 5, further comprising removing the pop-up display from the display area of the apparatus after the user message has been deleted.

7. A method according to claim 1, further comprising allowing a user to browse, in the pop-up display, a list of participants involved in the chat while simultaneously allowing the user to browse messages received in the chat.

8. An apparatus comprising a means for receiving messages, a means for transmitting messages, a control unit for controlling operation of the apparatus, a memory for storing user data, an application software required by the apparatus, a user interface and where the apparatus further comprises at the disposal of the apparatus when connected to a chat, a means for monitoring a plurality of alphanumeric keys for a press to begin composition of a chat message and for opening, in response to detecting a press of at least one of the alphanumeric keys being monitored at the apparatus, a pop-up display in a display area of the user interface, the pop-up display covering part of the display area of the apparatus and used for displaying a composed and edited user message suitable for forming part of the chat;
   wherein an uncovered part of the display area comprises a field for reading the received messages of the chat, and
   wherein the control unit is further for separately processing information in the pop-up display and information in the field for reading messages, such that the control unit processes information in the pop-up display without affecting the contents of the field for reading the received messages, and such that while the pop-up display area is open, the control unit is for allowing the contents of the field for reading the received messages to be read without any effect on the contents of the pop-up display.

9. A memory tangibly embodying a program of machine-readable instructions executable by a portable wireless apparatus to perform operations for composing/editing messages for a chat, the operations comprising
   allowing joining the chat,
   displaying messages from the chat on a display area of the apparatus,
   allowing selection, during the chat, of an operating mode at the apparatus, wherein the operating mode comprises options of: exiting the chat, moving into a menu function, or pressing any one of a plurality of alphanumeric keys at the apparatus to open a pop-up display,
   monitoring the plurality of alphanumeric keys for a press to begin composition of a chat message, and performing the selected operating mode, which comprises,
in response to pressing the any one of the plurality of alphanumeric keys, opening the pop-up display to cover part of the display area and allowing the pop-up display to be used for displaying a composed and edited user message suitable for forming part of the chat, in which the user message is composed and edited using input from at least one of the plurality of alphanumeric keys,
in which a part of the display area which is uncovered by the pop-up display comprises a field for reading the messages from the chat, and
wherein information in the pop-up display and information in the field for reading messages are processed separately such that processing the information in the pop-up display does not affect contents of the field for reading messages, and such that while the pop-up display is open the contents of the field for reading messages can be read without any effect on the contents of the pop-up display.

10. A memory according to claim 9 wherein the operations further comprise removing the pop-up display from the display area of the apparatus after a message has been sent or deleted.

11. A memory according to claim 9 where the operations further comprise separating the pop-up display from other fields of the display area of the apparatus in one of the following ways: separating the pop-up display by horizontal lines from the other fields of the display area, bringing a symbol on the display area that indicates writing/editing of text, changing the color of text entered in the pop-up display, changing the color of the background in the pop-up display, or changing the text font in the pop-up display.

12. A memory according to claim 9, where the operations further comprise, in response to a user selection, transmitting the user message as part of the chat.

13. A memory according to claim 12, where the operations further comprise removing the pop-up display from the display area of the apparatus after the user message has been transmitted.

14. A memory according to claim 9, where the operations further comprise, in response to a user selection, deleting the user message.

15. A memory according to claim 14, where the operations further comprise removing the pop-up display from the display area of the apparatus after the user message has been deleted.

16. A memory according to claim 9, wherein the operations further comprise allowing a user to browse, in the pop-up display, a list of participants involved in the chat while simultaneously allowing the user to browse messages received in the chat.

17. An apparatus comprising:
a receiver configured to receive messages,
a transmitter configured to transmit messages,
a control unit configured to control operation of the apparatus,
a memory configured to store user data,
a user interface comprising a display area, where the control unit is configured, in response to a request to join a chat to display messages from the chat on the display area, to monitor a plurality of alphanumeric keys for a press to begin composition of a chat message and in response to any one of the plurality of monitored alphanumeric keys at the apparatus being pressed during the chat, to open a pop-up display in the display area, the pop-up display covering part of the display area of the apparatus, and wherein the control unit is configured to allow the pop-up display to be used for displaying a composed and edited user message suitable for forming part of the chat,
wherein an uncovered part of the display area comprises a field for reading the messages from the chat, and
wherein the control unit is further configured to separately process information in the pop-up display and information in the field for reading messages, such that the control unit processes information in the pop-up display without affecting the contents of the field for reading messages, and such that while the pop-up display area is open, the control unit is configured to allow the contents of the field for reading messages to be read without any effect on the contents of the pop-up display.

18. An apparatus according to claim 17 where the control unit is further configured to separate the pop-up display from other fields of the display area of the apparatus in one of the following ways: separating the pop-up display by horizontal lines from the other fields of the display area, bringing a symbol on the display area that indicates writing/editing of text, changing the color of text entered in the pop-up display, changing the color of the background in the pop-up display, or changing the text font in the pop-up display.

19. An apparatus according to claim 17, where the control unit is further configured, in response to a user selection, to transmit the user message as part of the chat.

20. An apparatus according to claim 19, where the control unit is further configured to remove the pop-up display from the display area of the terminal after the user message has been transmitted.

21. An apparatus according to claim 17, where the control unit is further configured, in response to a user selection, to delete the user message.

22. An apparatus according to claim 21, where the control unit is further configured to remove the pop-up display from the display area of the terminal after the user message has been deleted.

23. An apparatus according to claim 17, wherein the control unit is further configured to allow a user to browse, in the pop-up display, a list of participants involved in the chat and to simultaneously allow the user to browse messages received in the chat.

\* \* \* \* \*